(12) United States Patent
Choi

(10) Patent No.: US 7,520,148 B2
(45) Date of Patent: *Apr. 21, 2009

(54) DRUM TYPE WASHING MACHINE

(75) Inventor: Soung Bong Choi, Changwon-si (KR)

(73) Assignee: LG Electronics Inc., Seoul (KR)

( * ) Notice: Subject to any disclaimer, the term of this patent is extended or adjusted under 35 U.S.C. 154(b) by 519 days.

This patent is subject to a terminal disclaimer.

(21) Appl. No.: 10/981,481

(22) Filed: Nov. 5, 2004

(65) Prior Publication Data

US 2005/0097928 A1    May 12, 2005

(30) Foreign Application Priority Data

Nov. 6, 2003    (KR)    ............. 10-2003-0078481

(51) Int. Cl.
- B08B 3/12 (2006.01)
- D06F 21/00 (2006.01)
- D06F 23/00 (2006.01)
- D06F 25/00 (2006.01)

(52) U.S. Cl. ............ 68/140; 68/3 R; 68/23.1; 68/253 C; 68/269 C; 68/269 R; 310/216; 310/217; 310/254; 310/257; 310/258; 310/259; 310/261; 310/263; 310/264

(58) Field of Classification Search .......... 68/3 R, 68/12.24, 43, 90, 139, 140, 217, 254, 23.1, 68/253 C, 269 B, 269 R; 310/216, 218, 259, 310/269, 261, 263, 264; 29/596
See application file for complete search history.

(56) References Cited

U.S. PATENT DOCUMENTS

| | | | | |
|---|---|---|---|---|
| 4,813,248 A | * | 3/1989 | Smith et al. | ............. 68/23.7 |
| 5,040,285 A | * | 8/1991 | Williams et al. | ............. 29/596 |
| 5,809,809 A | * | 9/1998 | Neumann | ............. 68/140 |
| 5,862,686 A | | 1/1999 | Skrippek | |
| 6,460,382 B1 | * | 10/2002 | Kim et al. | ............. 68/140 |
| 6,477,869 B2 | * | 11/2002 | Heyder et al. | ............. 68/140 |
| 7,138,741 B2 | * | 11/2006 | Lee | ............. 310/216 |
| 2001/0013168 A1 | | 8/2001 | Asao et al. | |
| 2004/0163428 A1 | * | 8/2004 | Kim et al. | ............. 68/140 |

(Continued)

FOREIGN PATENT DOCUMENTS

CN    1293276 A    5/2001

(Continued)

Primary Examiner—Michael Barr
Assistant Examiner—Rita R Patel
(74) Attorney, Agent, or Firm—McKenna Long & Aldridge LLP

(57) ABSTRACT

In one aspect, a drum type washing machine includes, among other things, a tub supporter of metal between a wall of a tub and a stator, where the stator includes an annular helical type core having multiple layers formed by winding a steel plate having Ts and a base portion in a helix starting from a bottom layer to a top layer, an insulator insert molded with the helical type core to cover an outside surface of the helical type core for electrical insulation of the helical type core, and three fastening portions formed, as a unit with the insulator projected from an inside circumferential surface of the helical type core toward a center of the stator, for fastening the stator to the tub supporter, wherein the fastening portion has a fastening hole at a center for fastening the stator to the wall of the tub with screws.

19 Claims, 11 Drawing Sheets

U.S. PATENT DOCUMENTS

2005/0241346 A1 * 11/2005 Choi .................... 68/140

FOREIGN PATENT DOCUMENTS

| | | |
|---|---|---|
| CN | 1293277 A | 5/2001 |
| EP | 0 620 308 | 10/1994 |
| EP | 0 629 735 | 12/1994 |
| EP | 1 079 014 | 2/2001 |
| EP | 1 094 144 | 4/2001 |
| EP | 1 094 145 | 4/2001 |
| EP | 1 116 812 | 7/2001 |
| EP | 1 428 924 | 6/2004 |
| JP | 01117632 A | 5/1989 |
| JP | 2000116037 A | 4/2000 |
| JP | 2001-113089 | 4/2001 |
| JP | 2001178989 A | 7/2001 |
| JP | 2002034221 A | 1/2002 |
| JP | 2003164087 A | 6/2003 |

* cited by examiner

DRUM TYPE WASHING MACHINE

CROSS-REFERENCE TO RELATED APPLICATIONS

This application claims the benefit of Korean Application No. P2003-00789481 filed on Nov. 6, 2003, which is hereby incorporated by reference as if fully set forth herein.

BACKGROUND OF THE INVENTION

1. Field of the Invention

The present invention relates to drum type washing machines, and more particularly, to a structure of driving part of a direct coupling type drum type washing machine.

2. Discussion of the Related Art

In general, in a drum type washing, the washing is performed by using friction between a drum rotated by driving force of a motor and laundry in a state detergent, washing water, and the laundry are introduced into the drum, and gives almost no damage to the laundry, has no entangling of the laundry, and can provide a pounding, and rubbing washing effect.

A related art drum type washing machine will be described briefly with reference to FIG. 1.

FIG. 1 illustrates a longitudinal section of a related art drum type washing machine, provided with a tub 2 on an inside of a cabinet 1, a drum 3 rotatably mounted at a center of an inside of the tub 2.

Under the tub 2, there is a motor 5a coupled to a motor pulley 18 with a shaft. There is a drum shaft connected to a rear of the drum 3, having a drum pulley 19 mounted thereon. The drum pulley 19 on the drum shaft and the motor pulley 18 coupled to the motor 5a are coupled with a belt 20, a power transmission element.

There is a door on a front of the cabinet 1, with a gasket 22 between the door 21 and the tub 2.

In the meantime, between the cabinet 1 at an inside of an upper portion thereof and the tub 2 at an upper side of an outside circumference thereof, there are hanging springs 23 for hanging the tub 2, and between the cabinet 1 at an inside of a lower portion thereof and the tub 2 at an lower side of an outside circumference thereof, there are friction dampers 24 for attenuating vibration of the tub 2 occurred at the time of spinning.

However, the related art drum type washing machine, transmitting driving force from the motor 5a to the drum 3 through the motor pulley 18, the drum pulley 19, and the belt 20 coupling the motor pulley 18 and the drum pulley 19, has the following disadvantages.

Because the driving force is transmitted to the drum 3 from the motor 5a, not directly, but through the motor pulley 18, the drum pulley 19, and the belt 20, there is an energy loss occurred in a process of driving force transmission.

Moreover, because the driving force is transmitted to the drum 3 from the motor 5a, not directly, but through many components, such as the motor pulley 18, the drum pulley 19, and the belt 20, there is much noise occurred in the process of power transmission.

Because many components, such as the motor pulley 18, the drum pulley 19, and the belt 20, for transmission of the driving force from the motor 5a to the drum 3, many assembly man-hours are required.

In proportion to a number of components required for transmission of the driving force from the motor 5a to the drum 3, number and frequency of fault occurrences become greater.

In summary, transmitting driving force from the motor 5a to the drum 3 through the motor pulley, the drum pulley, and the belt indirectly, the related art drum type washing machine is liable to cause faults, and noise, has many energy wasting factors, and results in poor washing performance.

Along with this, because of the tub 2 formed of stainless steel, the related art drum type washing machine is expensive, has a poor formability, and is heavy.

Consequently, in order to solve the problems of the related art drum type washing machine, a direct coupling type drum type washing machine with a BLDC motor is suggested.

However, since the direct coupling type drum type washing machines with BLDC motors developed up to the present time still has various disadvantages and problems in view of structures, process lines, or operations, there are requirements for direct coupling type drum type washing machines of new structures.

That is, the related art drum type washing machine has much waste of materials, such as core, and so on, in fabrication of the motor, or has a problem of complicate fabrication process, and strengths of the tub or the stator mounted thereon are weak for mounting the motor on the tub, to fail in attenuating vibration and noise, effectively.

Particularly, the washing machine which rotates the drum directly with the BLDC motor has the stator mounted on a rear side of the tub, directly. In a case of the motor for a large capacity drum type washing machine, with weight of the stator only being 1.5 kg or more, and a spinning speed of 600~2000 RPM, a joining portion of the stator and the tub is broken due to weight of the stator, and vibration, shake, and deformation of the rotor 5 at the time of spinning.

That is, in a case of a drum type washing machine which employs a BLDC motor with a stator secured to a rear wall of the tub, since an axis direction of the stator is substantially parallel to a floor, vibration caused at the time of operation of the washing machine causes heavy damage at the joining portion of the stator with the tub rear wall.

In order to prevent this, in fabrication of a stator core in the related art, a metal sheet is pressed, to form Ts and base portion, and, at the same time with this, projections 500 are formed on an opposite side of the Ts for joining, and a plurality of which are stacked, to form a stator core as shown in FIG. 2.

However, fabrication of above SC (Sectional type core) of the stator, not only is complicate, but also has waste of much material.

For reducing waste of material, and simplifying the fabrication process, though so called helical type core is favorable, in which a steel plate having the Ts and the base is stacked while turning the steel plate in an helix, the helical type core has disadvantage in that the projections 500 can not be formed toward an inner side of the core for joining the stator to the tub because a steel plate punched in a form of a stripe is required to be bent in a helix in fabrication of the helical type core.

This is because the projections 500 formed toward an inner side of the core make the stacking of the core by the turning the core in a helix impossible due to too great width of the core.

Consequently, a stator structure is required, in which a function identical to the projections of the sectional core SC is made to be performed not by the core itself, but by other part, for enabling application of the helical type core HC.

For reference, the reason that securing of an adequate rigidity of the projections each having a fastening hole for fastening the stator to the tub is important is as follows.

The washing machine which rotates the drum directly with the BLDC motor has the stator mounted on a rear side of the tub, directly. In a case of the motor for a large capacity drum type washing machine, with weight of the stator only being 1.5 kg or more, and a spinning speed of 600~2000 RPM, a joining portion of the stator and the tub is broken due to weight of the stator, and vibration, shake, and deformation of the rotor 5 at the time of spinning.

That is, in a case of a drum type washing machine which employs a BLDC motor with a stator secured to a rear wall of the tub, since an axis direction of the stator is substantially parallel to a floor, vibration caused at the time of operation of the washing machine causes heavy damage at the joining portion of the stator 6 with the tub rear wall.

Thus, securing of an adequate rigidity of the projections each having a fastening hole for fastening the stator 6 to the tub is very important.

Moreover, when an axis direction of the stator is parallel to the ground, with a heavy stator over 1.5 kg overhung therefrom, there has been breakage of a portion of the tub the stator is fastened thereto caused by the vibration.

SUMMARY OF THE INVENTION

Accordingly, the present invention is directed to a drum type washing machine that substantially obviates one or more problems due to limitations and disadvantages of the related art.

An object of the present invention is to provide a stator structure which can reduce material and weight required in fabrication of a stator of a BLDC motor, simplifies a fabrication process, and enables secure mounting of the stator to a mating part, such as a tub.

Another object of the present invention is to provide a structure which can sustain weight and vibration of a motor from a side of the tub in a case a washing machine BLDC motor is attached to a wall surface of the tub directly, which BLDC motor has 1.5 kg or more stator weight, and rotates at a speed varied in a range of 600~2,000 RPM.

Another object of the present invention is to provide a structure which enables easy assembly when a stator and the tub are assembled in an assembly line.

Another object of the present invention is to provide a driving unit structure which enables a service man to make easier service at a time of maintenance and replacement of a product.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a drum type washing machine includes a tub of plastic for holding washing water, the tub having a wall for mounting a driving unit thereto, a drum mounted on an inside of the tub, a shaft passed through the tub and coupled to the drum mounted inside of the tub, for transmission of driving force from a motor to the drum, at least one bearing for supporting the shaft, a bearing housing insert molded in the plastic tub for supporting the bearing, a stator to form the motor with a rotor, the rotor around the stator, and a tub supporter of metal between the wall of the tub and the stator, wherein the stator includes an annular helical type core having multiple layers formed by winding a steel plate having Ts and a base portion in a helix starting from a bottom layer to a top layer, an insulator insert molded with the helical type core to cover an outside surface of the helical type core for electrical insulation of the helical type core, and three fastening potions formed as a unit with the insulator projected from an inside circumferential surface of the helical type core toward a center of the stator, for fastening the stator to the tub supporter, wherein the fastening portion has a fastening hole at a center for fastening the stator to the wall of the tub with screws.

In another aspect of the present invention, a drum type washing machine includes a tub for holding washing water, the tub having a wall for mounting a driving unit thereto, a drum mounted on an inside of the tub, a shaft passed through the tub and coupled to the drum mounted inside of the tub, for transmission of driving force from a motor to the drum, at least one bearing for supporting the shaft, a bearing housing mounted to the tub for supporting the bearing, a stator to form the motor with a rotor, and the rotor around the stator, wherein the stator includes an annular helical type core having multiple layers formed by winding a steel plate having Ts and a base portion in a helix starting from a bottom layer to a top layer, an insulator insert molded with the helical type core to cover an outside surface of the helical type core for electrical insulation of the helical type core, and three fastening potions formed as a unit with the insulator projected from an inside circumferential surface of the helical type core toward a center of the stator, for fastening the stator to the bearing housing, wherein the fastening portion has a fastening hole at a center for fastening the stator to the wall of the tub with screws.

In another aspect of the present invention, a drum type washing machine includes a tub of plastic for holding washing water, the tub having a wall for mounting a driving unit thereto, a drum mounted on an inside of the tub, a shaft passed through the tub and coupled to the drum mounted inside of the tub, for transmission of driving force from a motor to the drum, at least one bearing for supporting the shaft, a bearing housing fixedly secured to a wall of the tub for supporting the bearing, a stator to form the motor with a rotor, and the rotor around the stator, wherein the stator includes an annular helical type core having multiple layers formed by winding a steel plate having Ts and a base portion in a helix starting from a bottom layer to a top layer, an insulator of an insulating material insert molded with the helical type core to cover an outside surface of the helical type core, and fastening potions formed as a unit with the insulator projected from an inside circumferential surface of the helical type core toward a center of the stator, for fastening the stator to the tub, wherein the fastening portion has a fastening hole at a center for fastening the stator to the wall of the tub with screws, wherein the insulator of the stator includes positioning projections, or holes, and the wall of the tub includes holes, or projections in complementary to the positioning projections, or holes of the insulator, and the wall of the tub includes fastening holes in correspondence to fastening holes in the insulator of the stator.

In another aspect of the present invention, an outer rotor type BLDC motor includes a stator including an annular helical type core having multiple layers formed by winding a steel plate having Ts and a base portion in a helix starting from a bottom layer to a top layer, an insulator formed by placing the helical type core in a mold for forming the insulator, and covering with an insulating material for insulation of the helical type core, three fastening potions formed as a unit with the insulator projected from an inside circumferential surface of the helical type core toward a center of the stator, and coils wound on the Ts of the helical type core respectively, and a rotor around the stator, having cooling fins and vent holes for cooling the stator.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIGS. 6A and 6B illustrate enlarged views of key parts of FIG. 4, wherein

FIG. 6A illustrates a plan view of the key parts, and

FIG. 6B illustrates a perspective view of the key parts;

DETAILED DESCRIPTION OF THE INVENTION

Reference will now be made in detail to the preferred embodiments of the present invention, examples of which are illustrated in the accompanying drawings FIGS. 3~11. Wherever possible, the same reference numbers will be used throughout the drawings to refer to the same or like parts.

A first preferred embodiment of the present invention will be described with reference to FIGS. 3~7.

Figure 1:
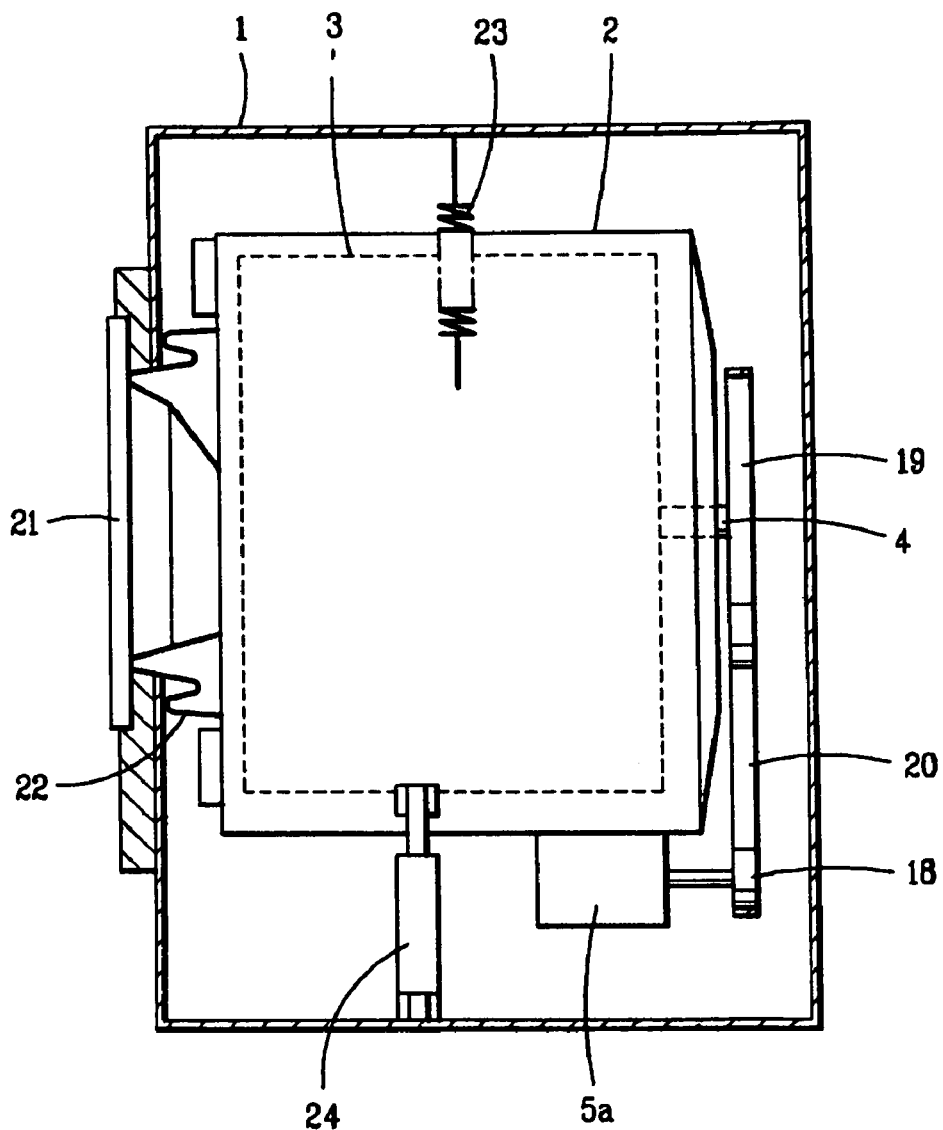
FIG. 1 illustrates a longitudinal section of a related art drum type washing machine, schematically.
Figure 2:
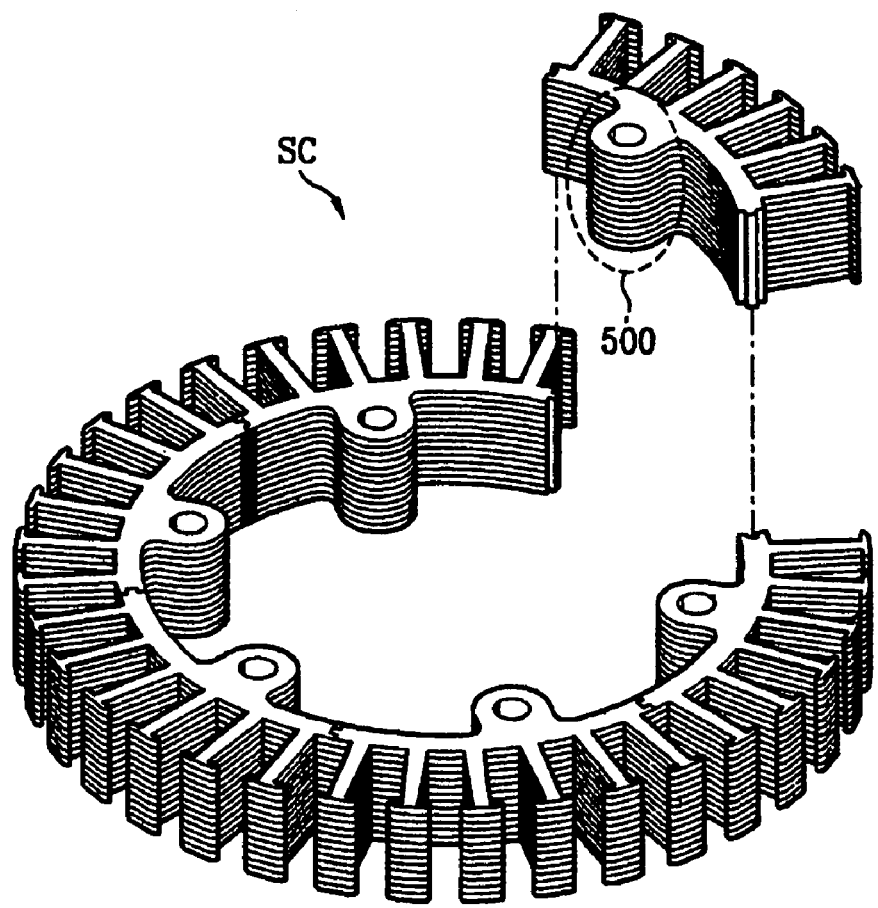
FIG. 2 illustrates a perspective view of a related art sectional core.
Figure 3:
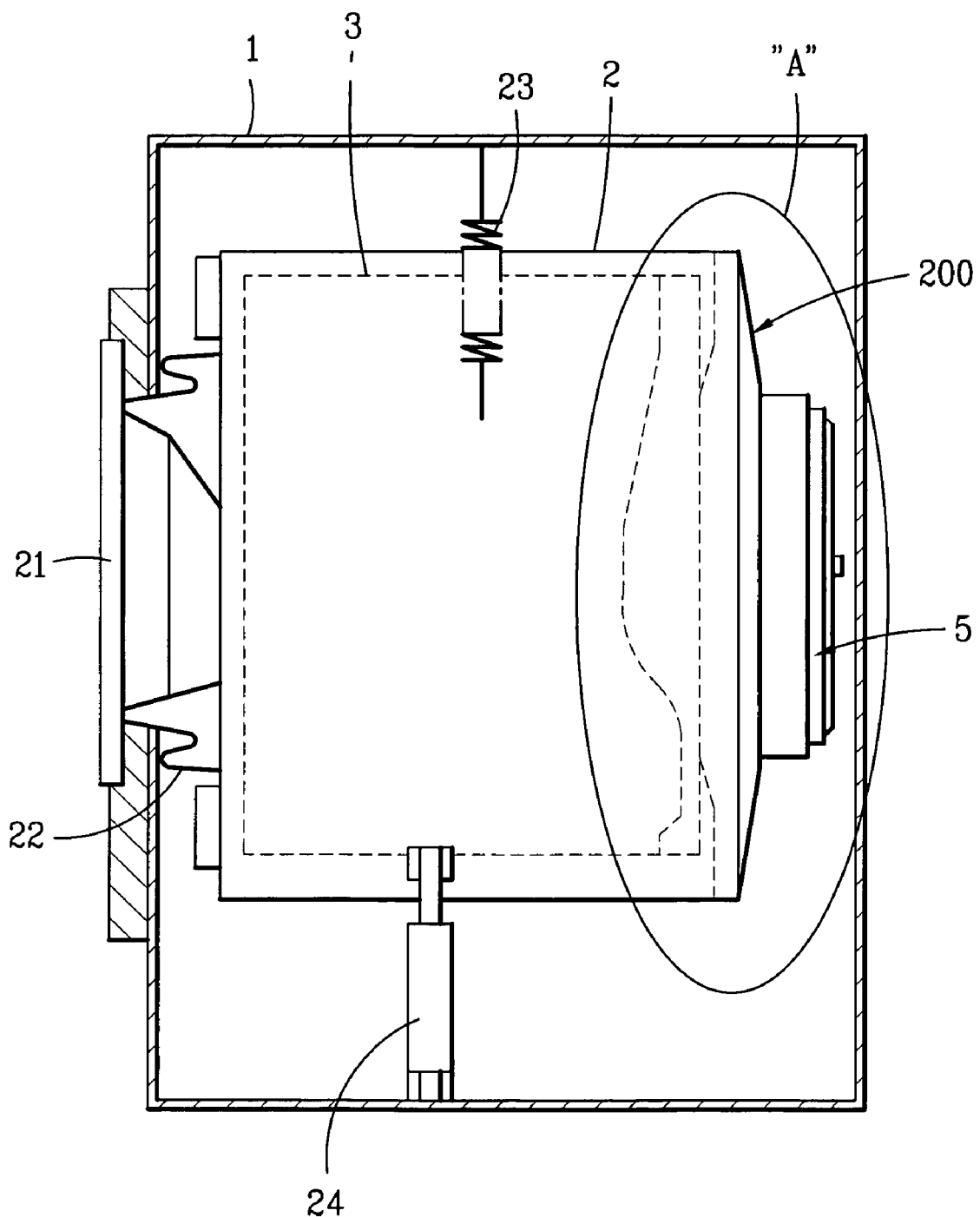
FIG. 3 illustrates a longitudinal section of a drum type washing machine in accordance with a preferred embodiment of the present invention.
Figure 4:
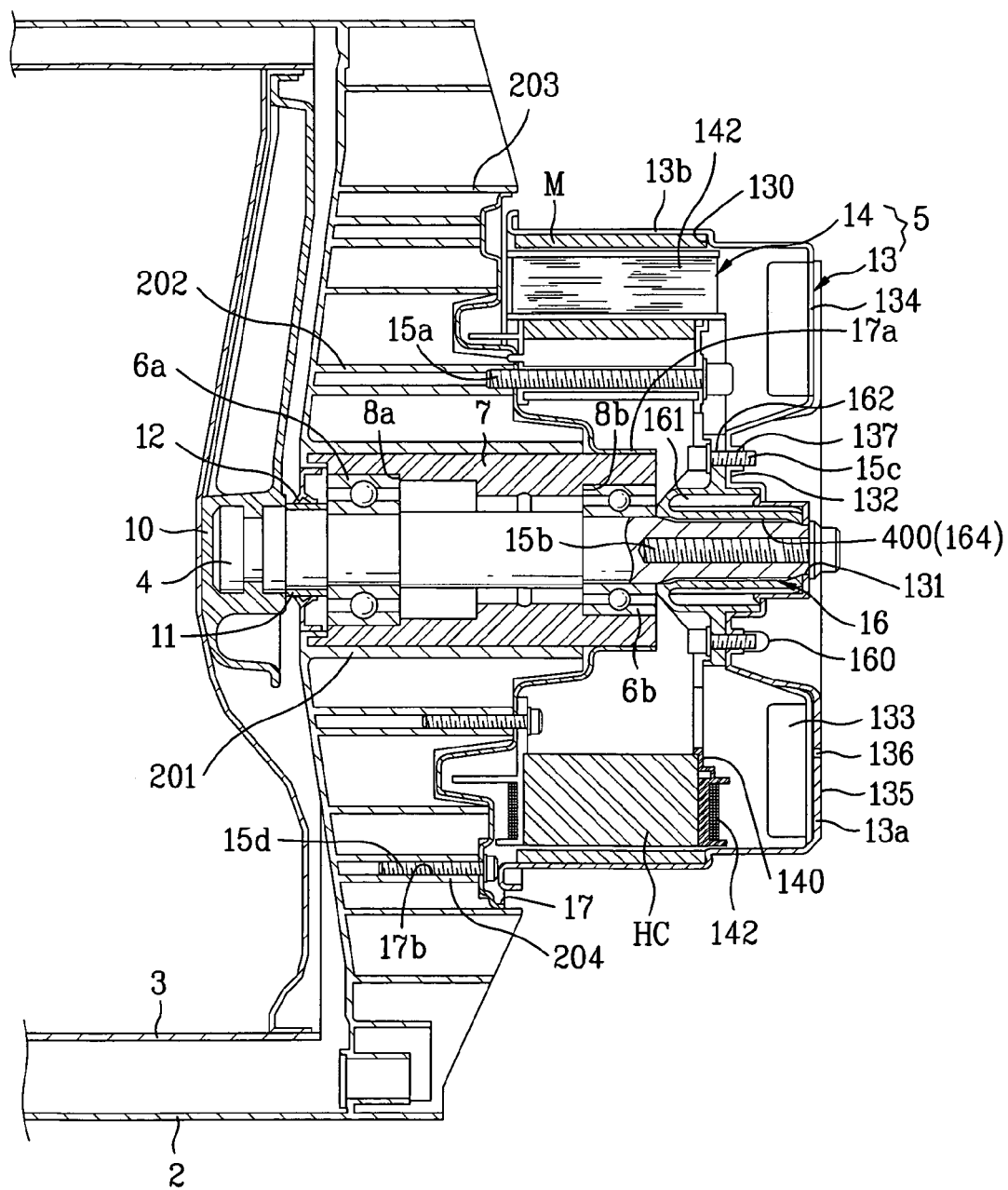
FIG. 4 illustrates a longitudinal section of an "A" part in FIG. 3, showing a detail of a driving unit of a drum type washing machine in accordance with a preferred embodiment of the present invention.

FIG. 3 illustrates a longitudinal section of a drum type washing machine in accordance with a preferred embodiment of the present invention, and FIG. 4 illustrates a longitudinal section of an "A" part in FIG. 3, showing a detail of a driving unit of a drum type washing machine in accordance with a preferred embodiment of the present invention.

Figure 5:
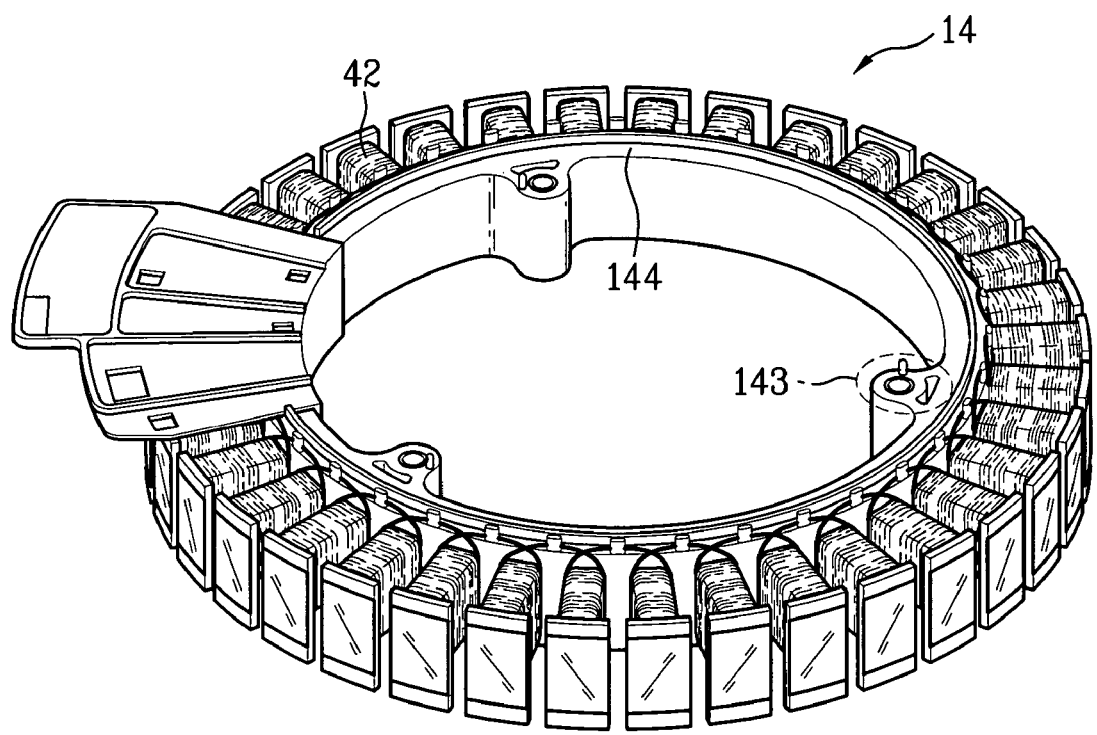
FIG. 5 illustrates a perspective view of the stator in FIG. 4.
Figure 6A:
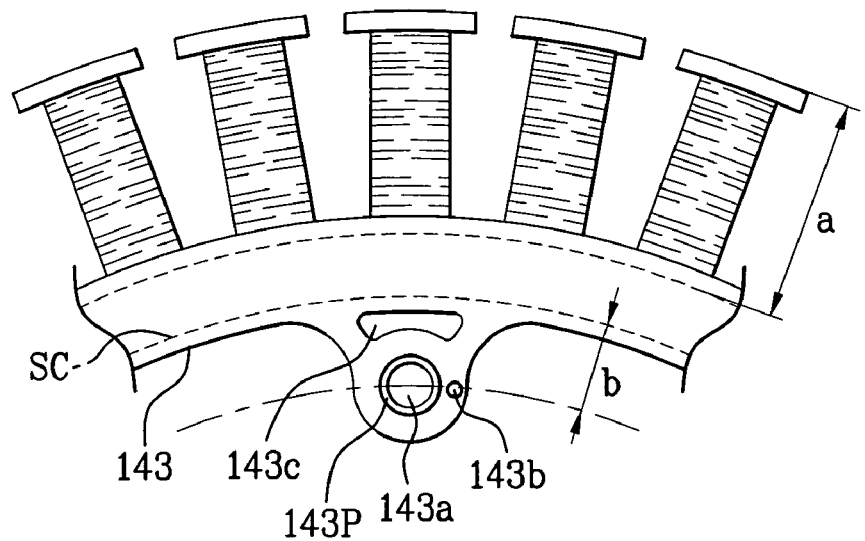
Figure 6B:
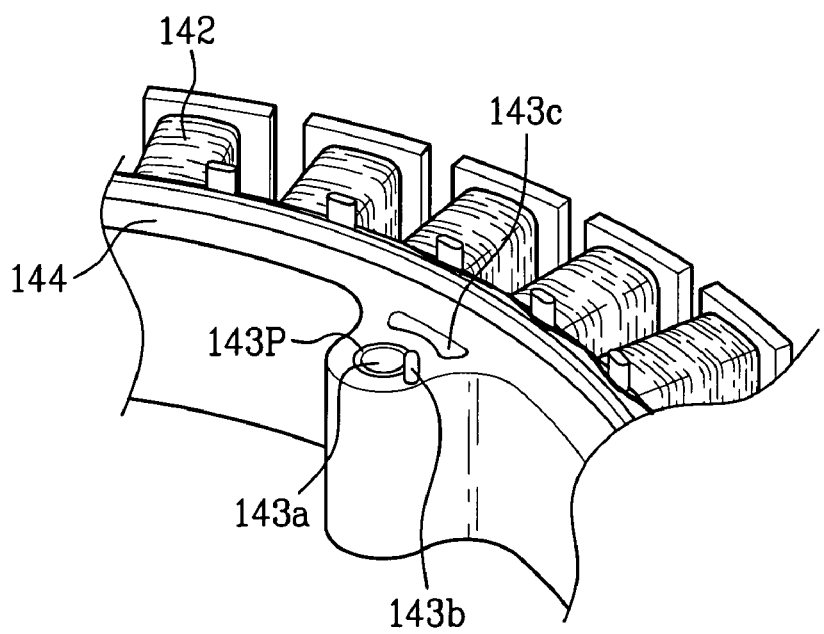
Figure 7:
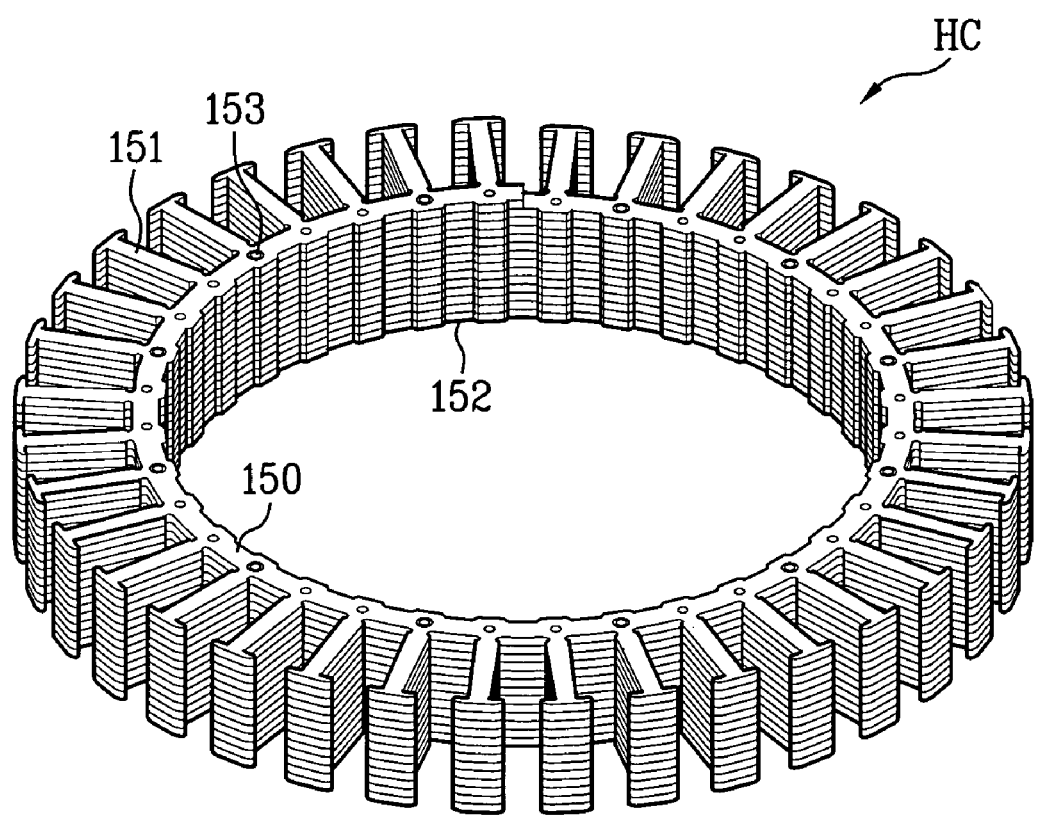
FIG. 7 illustrates a perspective view of a helical type core applicable to a stator in accordance with a preferred embodiment of the present invention.

FIG. 5 illustrates a perspective view of the stator in FIG. 4, FIGS. 6A and 6B illustrate enlarged views of key parts of FIG. 4, wherein FIG. 6A illustrates a plan view of the key parts, and FIG. 6B illustrates a perspective view of the key parts, and FIG. 7 illustrates a perspective view of a helical type core applicable to a stator in accordance with a preferred embodiment of the present invention.

The drum type washing machine in accordance with a first preferred embodiment of the present invention includes a tub 2 of plastic having a wall portion for securing a driving unit thereto, for holding washing water, a drum 3 mounted on an inside of the tub 2, a shaft 4 passed through the tub 2 and coupled to the drum 3 inside of the tub 2, at least one bearings 6*a*, and 6*b* for supporting the shaft 4, a bearing housing 7 insert molded in the plastic tub 2 for supporting the bearings 6*a*, and 6*b*, a stator 14 of a motor, a rotor 13 of the motor surrounding an outside circumference of the stator 14, a tub supporter 17 of metal between the wall of the tub 2 and the stator 14.

The stator 14, with a weight 1.5 kg or more, includes an annular helical type core HC having multiple layers formed by winding a steel plate having Ts 151 and a base portion 150 in a helix starting from a bottom layer to a top layer, an insulator 144 of an insulating material insert molded with the helical type core HC to cover an outside surface of the helical type core HC for electrical insulation of the helical type core HC, and at least three fastening potions 143 formed as a unit with the insulator 144 projected from an inside circumference of the helical type core HC toward a center of the stator 14, for fastening the stator 14 to a tub supporter 17.

The fastening portion 143 has a fastening hole 143*a* at a center for fastening the stator 14 to the wall of the tub with screws.

The insulator 144 of the stator 14 has positioning projections 143*b*, and the tub supporter 17 has holes in complementary to the positioning projections 143*b* on the insulator 144, and the tub supporter 17 also has fastening holes in correspondence to the fastening holes 143*a* in the insulator 144 of the stator 14.

In this instance, the positioning holes may be formed in the insulator 144 of the stator 14, and the positioning projections may be formed on the tub supporter 17.

The stator 14 further includes a cylindrical metal 143*p* inserted in the fastening hole 143*a* at the center of the fastening portion 143. The cylindrical metal 143*p* may be, for an example, a spring pin with an incised portion for having elasticity, or a hollow pin for press inserted into the fastening hole 143*a*.

In the meantime, it is required that the fastening portion 143 has a height 20% or more than 20% of a total height of the core, or more preferably 20%~150%.

The fastening portion 143 is formed such that a≧b, where "a" denotes a length of the T 151 projected from an outside circumferential surface of the helical type core HC, and "b" denotes a distance from the inside surface of the helical type core HC to a center of the fastening hole 143*a* in the fastening portion 143.

Together with this, the fastening portion 143 of the stator 14 has a hollow portion 143*c* for damping vibration during driving the motor. The helical type core HC is riveted with rivets 13 through pass through holes in the base portion 150 for holding the multiple layers together. Moreover, a winding starting portion, and a winding end portion of the helical type core HC may be welded to the base portion 150, respectively.

In the meantime, the metallic bearing housing 7 has steps 8*a*, and 8*b* for supporting a front bearing 6*a* and a rear bearing 6*b* on an inside circumferential surface for preventing the bearings 6*a*, and 6*b* from breaking away from the bearing housing 7.

The shaft 4 inside of the bearing housing 7 for transmitting a driving force from the motor 5 to the drum 3 has steps at a front and a rear of an outside circumference for positioning the front bearing 6a and the rear bearing 6b on the shaft 4.

The shaft 4 has a front end fixedly secured to a spider 10 in the rear wall of the drum 3, and a section from an exposed portion in rear of the spider 10 to the front bearing 6a with a brass bushing 11 press fit thereon for preventing the shaft 4 from rusting, with a sealing member 12 fitted on an outside surface of the bushing 11 for preventing infiltration of water toward the bearing.

The shaft 4 has the rotor 13 of the direct drive motor 5 mounted at a center of a rear end portion, on an inner side of which the stator 14 is positioned, that is mounted on the rear wall of the tub 2 to form the direct drive motor together with the rotor 13.

Referring to FIG. 4, the rotor 13, formed of a steel plate, has a circumferential bent portion with a seating surface 130 for seating magnets M placed on a front of an inside surface of a side wall 13b extended forward from an edge of a rear wall 13a of the rotor 13, and a hub 132 in a center part of the rear wall 13a having a pass through hole 131 for passing fastening members 15a, such as bolts, in mounting the rotor 13 on the shaft 4.

It is preferable that the rotor 13 is formed by pressing.

The rotor 13 has a plurality of radial cooling fins 133 around the hub 132 for blowing air toward the stator 14 when the rotor 13 rotates, to cool down heat from the stator 14. Each of the cooling fins 133 has a length in the radial direction.

The cooling fin 133 is formed by lancing to be bent at 90° from the rear wall to direct an opened side of the rotor 13, and a through hole 134 formed in the lancing serves as a venting hole.

Together with this, the rotor 13 has embossing 135 between adjacent cooling fins 133 on the rear wall 13a for reinforcing the rotor 13, and drain holes 136 in the embossing 135.

The rotor 13 has fastening holes 137 for fastening a connector 16 engaged with a rear end portion of the shaft 4 in rear of the rear bearing 6b by means of serration, and positioning holes 138 for positioning the connector in mounting the connector on the shaft 4, both of which fastening holes 137 and positioning holes 138 are formed around the pass through hole 131 in the hub 132 at regular intervals.

The connector 16 is formed of plastic having a vibration mode different from the rotor 5 of steel plate, and also serves as a bushing for the rotor.

The connector 16 has positioning projections 160 for automatic positioning of the fastening holes 162 in the connector 16 and the fastening holes 137 in the rotor 13.

The connector 16 has a serration 164 on an inside circumferential surface complementary to the serration on the rear end portion of the shaft 4, and reinforcing ribs 161 on a hub of the connector 16, for reinforcing a strength of the connector 16.

The wall 200 of the tub 2 has a hub 201 for placing the bearing housing 7 therein in the injection molding of the tub, and the hub 201 has fastening bosses 202 formed at an outside along a circumferential direction at regular intervals for fixedly securing the stator 14 on the rear wall of the tub 2 with fastening members 15a.

Between the rear wall of the tub 2 and the stator 14, there is a tub supporter 17 having a shape almost same with an outside shape of the rear wall of the tub fixedly secured to the rear wall of the tub at the time of mounting the stator 14 for supporting the stator 14, and maintaining a concentricity of the stator 14.

In this instance, the tub supporter 17 has a front portion in close contact with an inner side surface of the rib 203 on one side of the rear wall of the tub, and a rear end portion in close contact with an outside circumferential surface of the rear end portion of the bearing housing 7, not covered with the hub 132 at a center of the rear wall of the tub, but exposed.

In the meantime, referring to FIG. 4, the stator 14 of the motor 5 includes a helical type core HC, an insulator 144 of an insulating material insert molded with the helical type core HC to cover an outside surface of the helical type core HC, coils 142 wound on the Ts 151 of the helical type core HC respectively, and at least three fastening potions 143 formed as a unit with the insulator 144 projected from an inside of the helical type core HC.

The helical type core HC has multiple layers formed by winding a steel plate in a helix starting from a bottom layer to a top layer. There are Ts 151 projected outwardly in a radial direction from a base portion 150 of the helical type core HC, and the base portion 150 of the helical type core HC has grooves 152 for reducing stress at the time of winding the core.

The helical type core HC is riveted with rivets 13 through pass through holes in the base portion 150 for holding the multiple layers together. Moreover, a winding starting portion, and a winding end portion of the helical type core HC may be welded to the base portion 150, respectively.

The groove 152 in the base portion 150 of the helical type core HC may be rectangular or trapezoidal, or an arc.

Referring to FIG. 5, the fastening portion 143 is formed such that $a \geqq b$, where "a" denotes a length of the T 151 projected from an outside circumferential surface of the helical type core HC, and "b" denotes a distance from the inside surface of the helical type core HC to a center of the fastening hole 143a in the fastening portion 143.

The fastening portion 143 has a height one fifths or more of a total height of the core, or, the same with the total height of the core.

The fastening portion 143 has at least one hollow portion 143c for damping vibration during driving the motor, and a positioning projection 143b complementary to the positioning hole in the rear wall of the tub 2.

In the meantime, of course, the positioning projections 143b may be formed on the rear wall of the tub 2, and the positioning holes complementary to the positioning projections on the rear wall of the tub 2 may be formed in the fastening portion 143.

The operation of the drum type washing machine in accordance with a first preferred embodiment of the present invention will be described.

When rotation of the rotor 13 is started by a current flowing through the coils 142 of the stator 14 in succession under the control of a motor driving controller (not shown) attached to a control panel, the shaft 4 engaged with the connector 16 secured to the rotor with a serration rotates. According to this, power is transmitted to the drum 3 through the shaft 4, to rotate the drum 3.

The working of the drum type washing machine having the driving unit of the present invention applied thereto will be described.

Fabrication of the drum type washing machine becomes easy, because the tub 2 is formed of plastic having a good heat resistance, and light by injection molding.

The drum type washing machine of the present invention is applicable even to a drum type washing machine having a spinning cycle, because the bearing housing 7, bearing supporting means, of a metal, such as aluminum, has no thermal deformation even at an elevated temperature.

Since the metal bearing housing 7 is inserted molded with the hub 201 of the rear wall of the tub at the time of injection molding of the tub 2 of plastic, to form one unit with the tub 2, omitting the step of assembling the bearing housing 7 to the rear wall of the tub, an assembly process can be simplified to reduce assembly man-hours.

Especially, referring to FIG. 4, since the stator 14 of the motor 5 has the groove 152 in the base portion 150 of the helical type core HC, to reduce stress caused by core winding, the winding can be made with a force smaller than the related art.

Taking a matter into account, in which even if positioning of the fastening hole 143a closer to a point of action of a load the more favorable in view of torque, if the fastening hole 143a is positioned too close to the point of action of the load, excessively small diametered bolts are required, to require excessively many number of bolts, the relation of the a≧b of fastening portion 143 is determined, where "a" denotes a length of the T 151 projected from an outside circumferential surface of the helical type core HC, and "b" denotes a distance from the inside surface of the helical type core HC to a center of the fastening hole 143a in the fastening portion 143.

The fastening portion 143 has a height 20%~150% of the total height of the core, for preventing the fastening portion 143 from breaking when the fastening portion 143 has a height below 20% of the total core height.

Though the higher the total height of the fastening portion 143, the better the rigidity of the fastening portion 143, because excessive height of the fastening portion 143 can increase a total width of the driving unit of the washing machine, resulting in a washing capacity of the washing machine, the total height of the fastening portion is set to be less than 150% of the total height of the core.

The hollow 143c in the fastening portion 143 buffers and dampens vibration occurred at the time of driving the motor, to improve mechanical reliability of the stator 14.

The positioning projection 143b on the fastening portion 143 fits into the positioning hole in the tub 2, enabling easy fastening of the stator 14.

Of course, the positioning projection may be on the tub 2, while the positioning hole is formed in the fastening portion 143.

The " ⌐ " shaped step 8a on the front of the inside circumferential surface, and the " ∟ " shaped step 8b on the rear of the inside circumferential surface of the bearing housing 7 of the present invention enable to support a rear end of the front bearing 6a and a front end of the rear bearing 6b mounted on an outside circumferential surface of both end portions of the shaft 4.

That is, the metallic bearing housing 7 can support the bearings 6a, and 6b to prevent the bearings 6a, and 6b from breaking away from the bearing housing 7 owing to the steps 8a, and 8b on opposite sides of the inside circumferential surface of the bearing housing 7.

Moreover, the positioning steps on an outside circumferential surface of front and rear sides of the shaft 4 inside of the bearing housing 7 for transmitting driving force from the motor 5 to the drum 3 enable easy positioning of the front bearing 6a and the rear bearing 6b with respect to the shaft 4.

In the meantime, since the shaft 4 has a front end fixedly secured to a spider 10 in the rear wall of the drum 3, and a section from an exposed portion in rear of the spider 10 to the front bearing 6a with a brass bushing 11 press fit thereon, rusting of the shaft 4 can be prevented.

The sealing member 12 fitted on the outside surface of the bushing 11 prevents infiltration of water toward the bearing.

In the meantime, the rotor 13 is mounted on a center of the rear end portion of the shaft 4, and the stator 14 is positioned on an inside of the rotor 13, wherein the circumferential bent portion having magnet seating surfaces 130 extended forward from an edge of the rear wall 13a of the rotor 13 supports the magnets M at the magnet seating surfaces 130 when the magnets M are attached to the inside surface of the rotor 13, fabrication of the rotor is easy.

Moreover, the pass through hole 131 in the hub 132 at the center of the rear wall 13a of the rotor 13 enables pass of the fastening members 15b, such as bolts, for fastening the rotor 13 to the shaft, and the plurality of radial cooling fins 133 around the hub 132 of the rotor 13 each with a predetermined length blow air toward the stator 14 when the rotor 13 rotates, to cool down the heat from the stator 14.

The cooling fin 133 is formed to direct an opened side of the rotor 13 by lancing, and a through hole 134 formed in the lancing serves as a venting hole.

The rotor 13 formed of steel plate by pressing reduces a fabrication time period, to improve productivity of the rotor.

Together with this, the rotor 13 has embossing 135 between adjacent cooling fins 133 on the rear wall 13a for reinforcing the rotor 13, and drain holes 136 in the embossing 135 for draining water therethrough.

The rotor 13 has fastening holes 137 for fastening a connector 16, and positioning holes 138 for positioning the connector in mounting the connector, both of which fastening holes 137 and positioning holes 138 are formed around the pass through hole 131 in the hub 132 of the rotor 13.

That is, upon positioning the positioning projections 160 on the connector 16 at the positioning holes 138 in the rotor 13, the fastening holes 137 and 162 in the rotor 13 and the connector 16 are aligned automatically, to make fastening of the fastening members 15c easy.

Since the connector 16 is formed of plastic having a vibration mode different from the rotor 5 of steel plate, the connector dampens vibration from the rotor 13 before the vibration is transmitted to the shaft 4.

The serration 164 on the inside circumferential surface of the hub 201 of the connector 16 engaged with the serration 400 on the rear end portion of the shaft 4 enables transmission of the rotating force from the rotor 13 to the shaft 4 through the connector 16. The reinforcing ribs 161 on the outside of the hub 201 of the connector 16 reinforce strength of the hub 201.

The fastening bosses 202 on the outside of the hub 201 on the rear wall of the tub 2 along a circumferential direction at regular intervals enable to mount the stator 14 on the rear wall of the tub, securely.

The tub supporter 17, having almost the same outside shape with the rear wall fixedly secured to the rear wall of the tub 2, between the rear wall of the tub 2 and the stator 14 enables to support the stator 14 and maintains concentricity of the stator 14.

That is, once the tub supporter 17 is fastened to the supporter fastening bosses 204 on the rear wall of the tub, the front end portion of the tub supporter 17 is brought into close contact with an inside surface of the ribs 203 on one side of the rear wall of the tub, and the rear end portion of the tub supporter 17 is brought into close contact with the outside circumferential surface of the rear end portion of the bearing housing 7 not surrounded by the hub 132, but exposed, to support the stator 14 and to maintain the concentricity of the stator.

Figure 8:
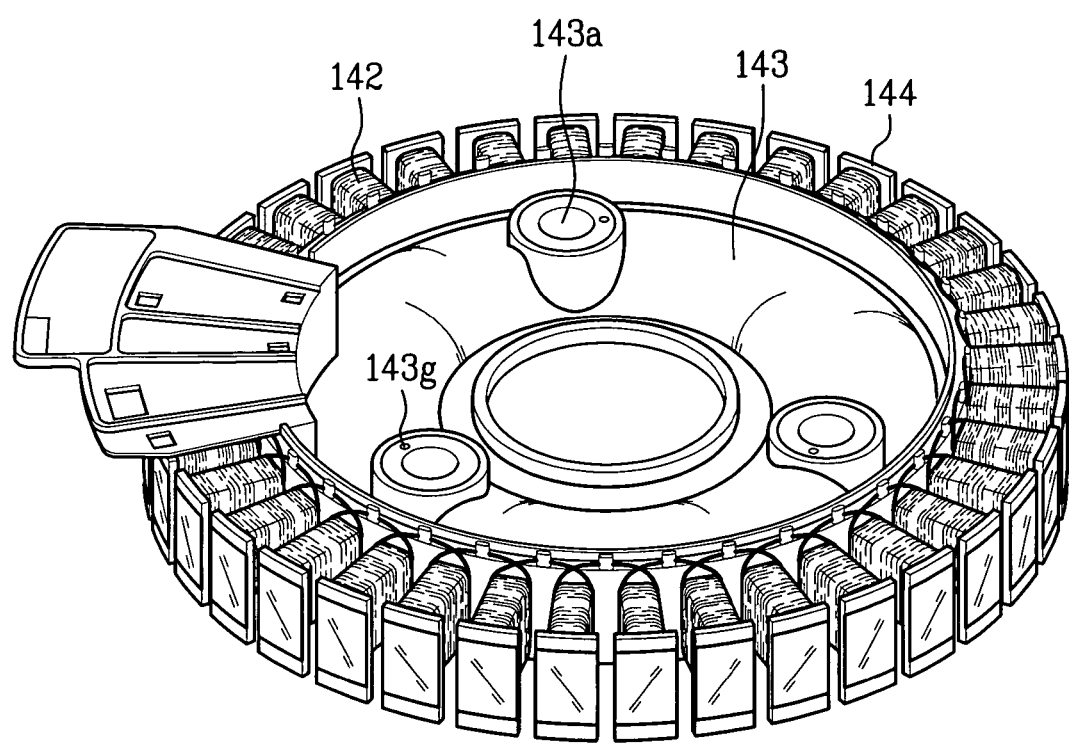
FIG. 8 illustrates a perspective view of the stator in FIG. 5 in accordance with another preferred embodiment of the present invention.

FIG. 8 illustrates a perspective view of the stator in FIG. 5 in accordance with another preferred embodiment of the present invention.

Referring to FIG. 8, the stator 14 of this embodiment includes an annular helical type core HC having multiple layers formed by winding a steel plate with Ts 151 and base portion 150 in a helix starting from a bottom layer to a top layer, an insulator 144 of an insulating material insert molded with the helical type core HC to cover an outside surface of the helical type core HC, and fastening portions 143 projected from an inside circumferential surface of the helical type core HC projected toward a center of he stator 14 formed as one unit with the insulator 144, for fixedly securing the stator 14 to the tub 2.

The fastening portion 143 has a fastening hole 143a at a center for fastening the stator 14 to the wall of the tub with screws.

The insulator 144 of the stator 14 has positioning holes 143g, and the rear wall 200 of the tub has projections complementary to the positioning holes 143g. The insulator 144 of the stator 14 has fastening holes 143a, and the tub 2 has fastening holes complementary to the fastening holes 143a.

The positioning projection may be formed on the insulator 144 of the stator 14, and the positioning holes may be formed in the rear wall of the tub.

In this case too, the fastening portion 143 is formed such that a≧b, where "a" denotes a length of the T 151 projected from an outside circumferential surface of the helical type core HC, and "b" denotes a distance from the inside surface of the helical type core HC to a center of the fastening hole 143a in the fastening portion 143, under the same reason described before.

Figure 9:
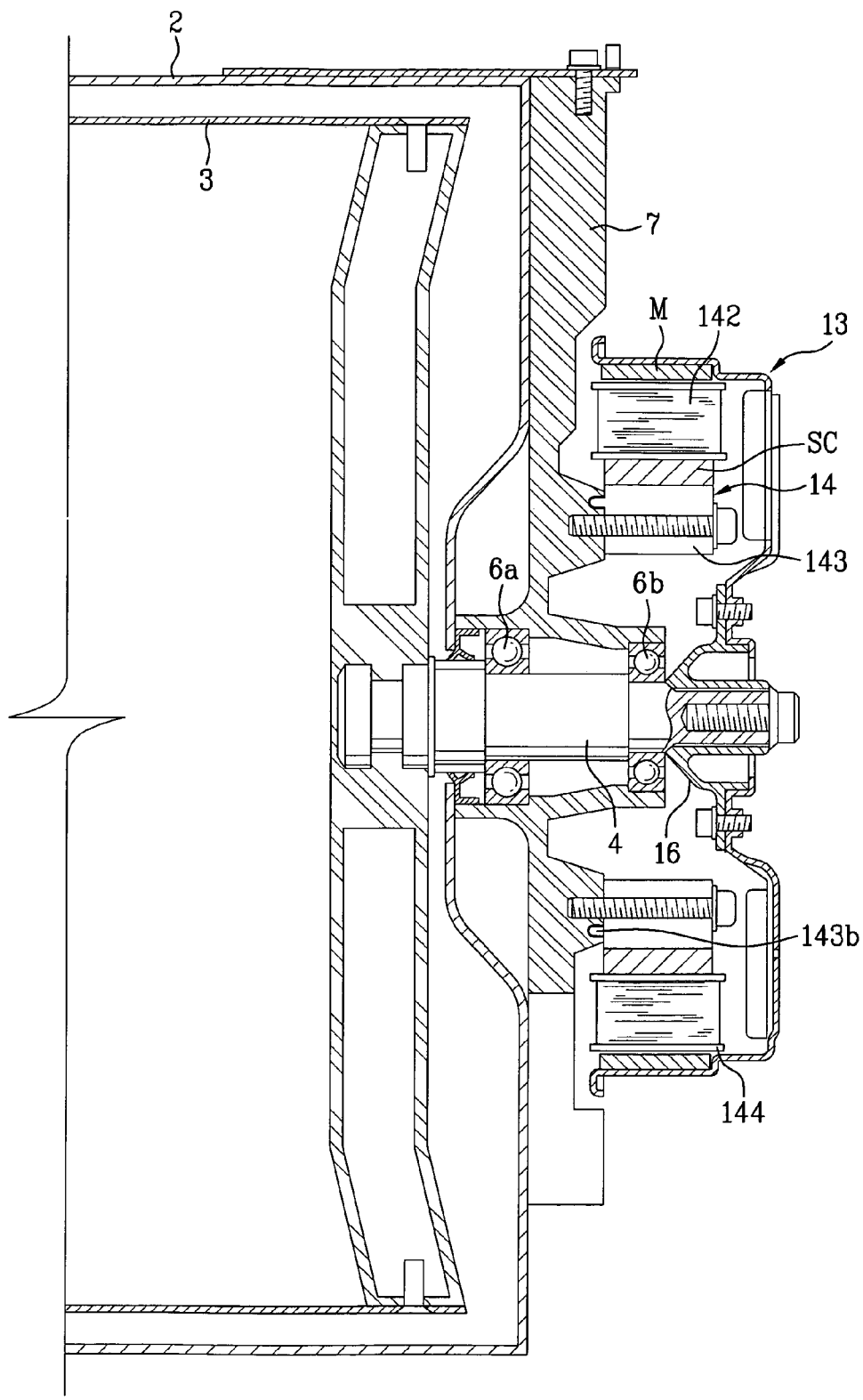
FIG. 9 illustrates a longitudinal section of "A" part in FIG. 3, showing a detail of a driving unit in accordance with another preferred embodiment of the present invention.

In the meantime, FIG. 9 illustrates a longitudinal section of "A" part in FIG. 3, showing a detail of a driving unit in accordance with another preferred embodiment of the present invention.

Referring to FIG. 9, the drum type washing machine includes a tub 2 of metal, a drum 3 rotatably mounted on an inside of the tub 2, a shaft 4 passed through the tub 2 and coupled to the drum mounted on the inside of the tub 2, for transmission of driving force from a motor to the drum 3, bearings 6b and 6b mounted to support the shaft, a bearing housing 7 mounted to a rear wall of the tub 2 to support the bearings, a rotor 13 fixedly secured to a rear end portion of the shaft, to form the motor together with a stator 14, and the stator 14 on an inside of the rotor 13 secured to the rear wall of the tub to form the motor together with the rotor 13, wherein the stator 14 includes a helical type core HC, an insulator 144 of an insulating material insert molded with the helical type core HC to cover an outside surface of the helical type core HC, coils 142 wound on the Ts 151 of the helical type core HC respectively, and at least three fastening portions 143 formed as one unit with the insulator 144 and projected toward an inside of the core.

Alike the foregoing embodiment, the helical type core HC has multiple layers formed by winding a steel plate in a helix starting from a bottom layer to a top layer. There are a plurality of Ts 151 projected outwardly in a radial direction from a base portion 150, and the base portion 150 has grooves 152 for reducing stress when the core is wound.

Elements and functions thereof described in the foregoing embodiment, but not this embodiment are the same with the foregoing embodiment, and description of which will be omitted, for avoiding repetition.

Figure 10:
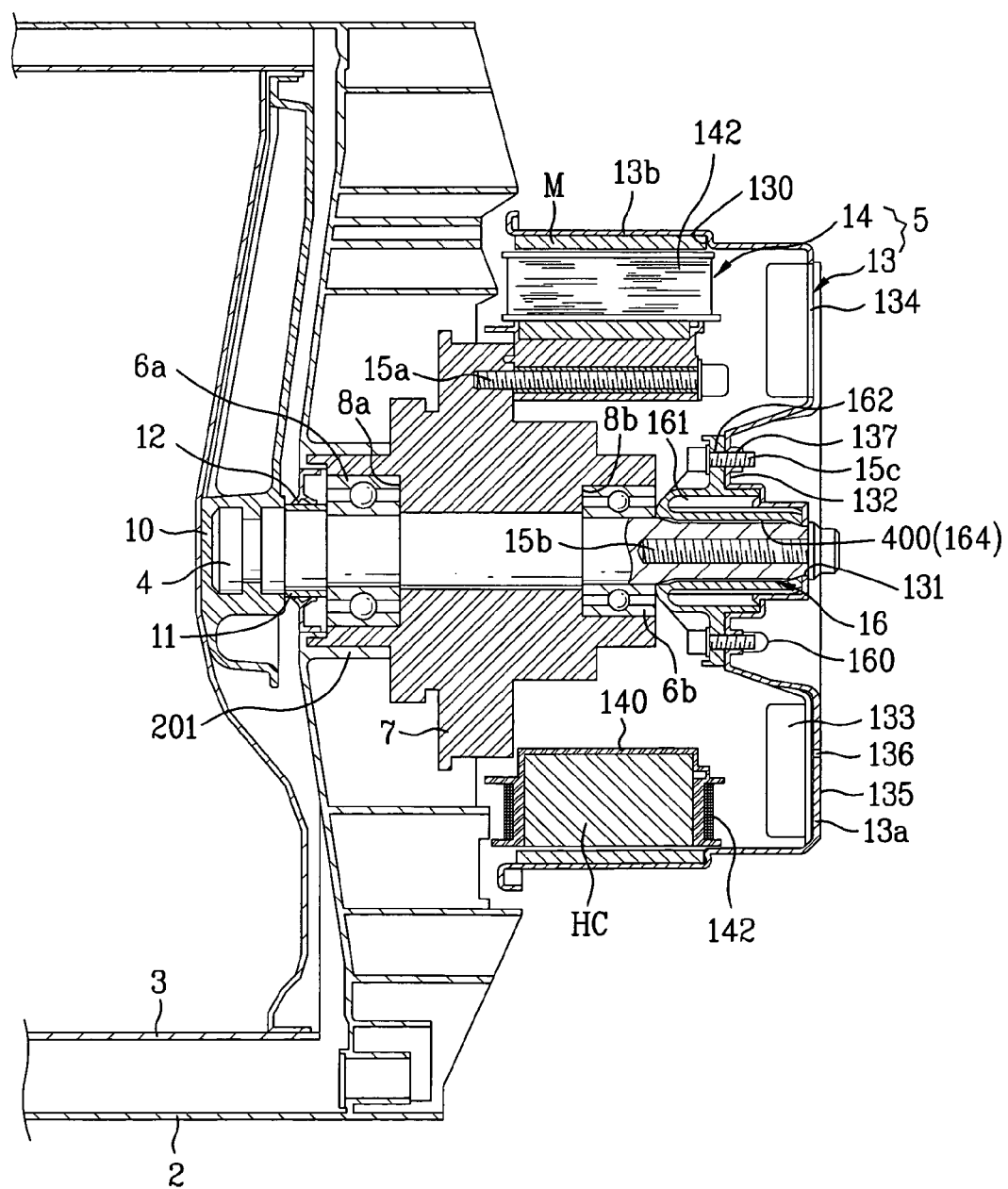
FIG. 10 illustrates a longitudinal section of "A" part in FIG. 3, showing a detail of a driving unit in accordance with another preferred embodiment of the present invention.

FIG. 10 illustrates a longitudinal section of "A" part in FIG. 3, showing a detail of a driving unit in accordance with another preferred embodiment of the present invention.

Referring to FIG. 10, the drum type washing machine includes a tub 2 for holding washing water, having a wall for mounting a driving unit thereto, a drum 3 mounted on an inside of the tub 2, a shaft 4 passed through the tub 2 and coupled to the drum 3 mounted inside of the tub, for transmission of driving force from a motor to the drum 3, at least one bearing 6a, and 6b for supporting the shaft 4, a bearing housing 7 secured to the tub 2 for supporting the bearing 6a, and 6b, a stator 14 with weight 1.5 kg or more, and a rotor 13 around the stator 14, wherein the stator 14 includes an annular helical type core HC having multiple layers formed by winding a steel plate having Ts 151 and a base portion 150 in a helix starting from a bottom layer to a top layer, an insulator 144 of an insulating material insert molded with the helical type core HC to cover an outside surface of the helical type core HC for electrical insulation of the helical type core HC, and at least three fastening potions 143 formed as a unit with the insulator 144 projected from an inside circumferential surface of the helical type core HC toward a center of the stator 14, for fastening the stator 14 to bearing housing 7. The fastening portion 143 has a fastening hole 143a for fastening the stator 14 to the bearing housing 7 with screws.

The tub 2 is formed of plastic, the bearing housing 7 is formed of an aluminum alloy, the bearing housing 7 is insert molded as one unit with the tub 2, and the stator 14 is attached to the bearing housing 7.

The stator 14 further includes a cylindrical metal 143p inserted in the fastening hole 143a at the center of the fastening portion 143. As described before, the cylindrical metal 143p may be, for an example, a spring pin with an incised portion for having elasticity, or a hollow pin for press inserting into the fastening hole 143a.

In the meantime, it is required that the fastening portion 143 has a height 20% or more than 20% of a total height of the core, or more preferably 20%~150%.

The fastening portion 143 is formed such that a≧b, where "a" denotes a length of the T 151 projected from an outside circumferential surface of the helical type core HC, and "b" denotes a distance from the inside surface of the helical type core HC to a center of the fastening hole 143a in the fastening portion 143.

Together with this, the fastening portion 143 of the stator 14 has a hollow portion 143c for damping vibration during driving the motor. The helical type core HC is riveted with rivets 13 through pass through holes in the base portion 150 for holding the multiple layers together. Moreover, a winding starting portion, and a winding end portion of the helical type core HC may be welded to the base portion 150, respectively.

In the meantime, the insulator 144 of the stator 14 has the positioning projections 143b formed thereon, the bearing housing 7 having the stator 14 directly mounted thereon has holes complementary to the positioning projections 143b, and the bearing housing 7 has fastening holes in correspondence to the fastening holes 143a in the insulator 144 of the stator 14.

Of course, positions of the projections and the holes in the insulator 144 and the bearing housing 7 may be exchanged.

In the meantime, in FIG. 10 of this embodiment, parts the same with the first embodiment will be given the same reference numerals, and description of names will be omitted. This is applicable to description of an embodiment described with reference to FIG. 11.

A driving unit for a drum type washing machine in accordance with another preferred embodiment of the present invention will be described with reference to FIG. 11.

Figure 11:
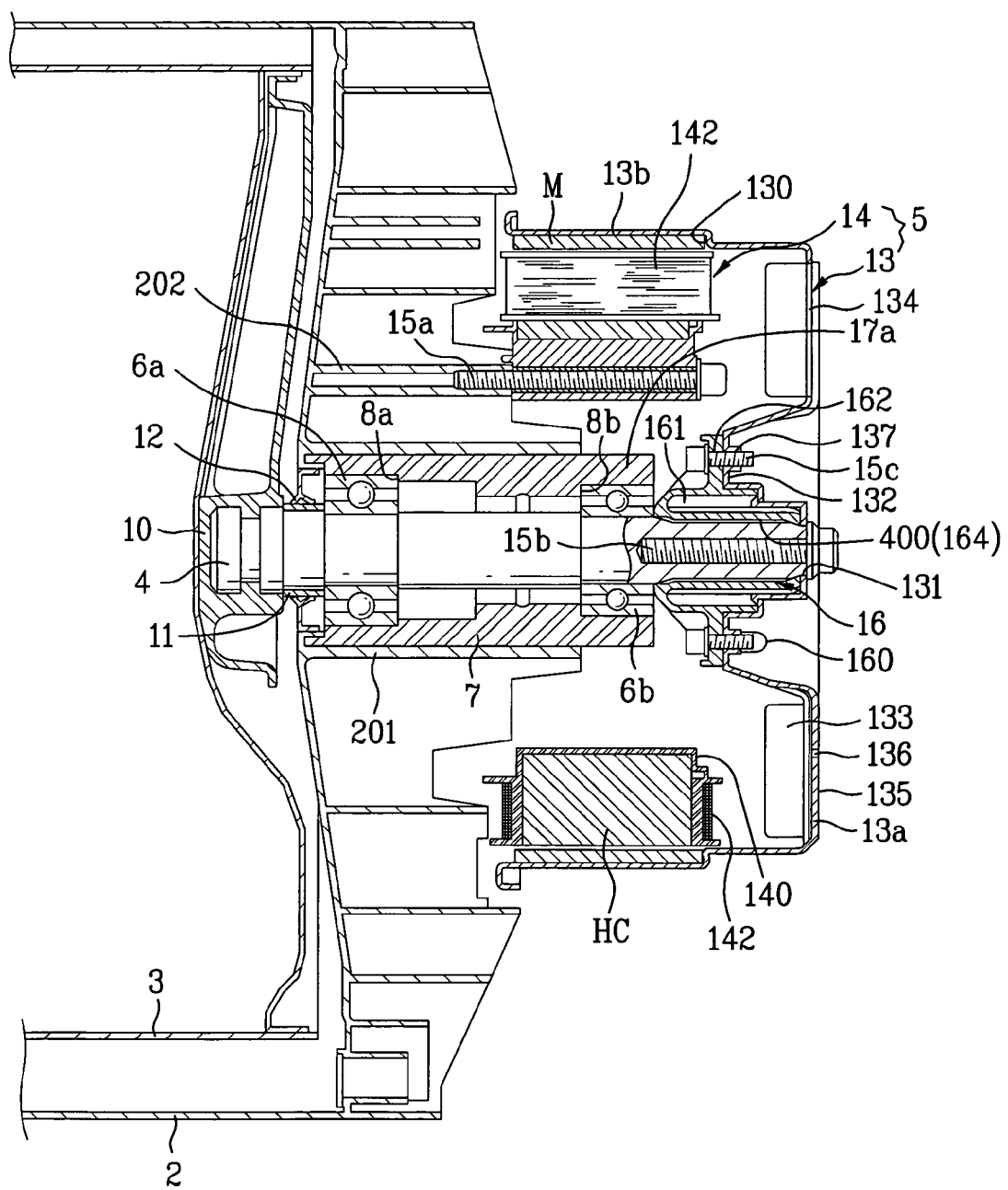
FIG. 11 illustrates a longitudinal section of "A" part in FIG. 3, showing a detail of a driving unit in accordance with another preferred embodiment of the present invention.

FIG. 11 illustrates a longitudinal section of "A" part in FIG. 3, showing a detail of a driving unit in accordance with another preferred embodiment of the present invention.

Referring to FIG. 11, the drum type washing machine includes a tub 2 of plastic for holding washing water, having a wall for mounting a driving unit thereto, a drum 3 mounted on an inside of the tub 2, a shaft 4 passed through the tub 2 and coupled to the drum 3 mounted inside of the tub, for transmission of driving force from a motor to the drum 3, at least one bearing 6a, and 6b for supporting the shaft 4, a bearing housing 7 secured to a wall of the tub 2 for supporting the bearing 6a, and 6b, a stator 14 with weight 1.5 kg or more, and a rotor 13 around the stator 14, wherein the stator 14 includes an annular helical type core HC having multiple layers formed by winding a steel plate having Ts 151 and a base portion 150 in a helix starting from a bottom layer to a top layer, an insulator 144 of an insulating material insert molded with the helical type core HC to cover an outside surface of the helical type core HC, and fastening potions 143 formed as a unit with the insulator 144 projected from an inside circumferential surface of the helical type core HC toward a center of the stator 14, for fastening the stator 14 to the tub 2.

The fastening portion 143 has a fastening hole 143a at a center for fastening the stator 14 to the wall of the tub 2 with screws.

Together with this, the insulator 144 of the stator 14 has positioning projections 143b or holes, the wall of the tub 2 has holes or projection complementary to the projections or holes of the insulator 144, the tub 2 has fastening holes in correspondence to the fastening holes 143a in the insulator 144 of the stator 14.

At least three of the fastening portions 143 are projected toward the center of the stator 14 at regular intervals.

The fastening portion 143 is formed such that $a \geqq b$, where "a" denotes a length of the T 151 projected from an outside circumferential surface of the helical type core HC, and "b" denotes a distance from the inside surface of the helical type core HC to a center of the fastening hole 143a in the fastening portion 143.

Thus, in fabrication of the stator 14 of the BLDC motor, the drum type washing machine of the present invention according to above embodiments can reduce required material and weight, simplify a fabrication process, and mount the stator 14 to a mating side, such as the tub 2, securely.

Moreover, the present invention can provide a structure which can sustain weight and vibration of a motor from a side of the tub 2 in a case a washing machine BLDC motor is attached to a wall surface of the tub directly, which BLDC motor has 1.5 kg or more stator weight, and rotates at a speed varied in a range of 0~2,000 RPM or more.

The drum type washing machine of the present invention enables easy assembly of the stator 14 with the tub 2 on an assembly line, and, according to this, service by a service man can be made easily at the time of after service.

It will be apparent to those skilled in the art that various modifications and variations can be made in the present invention without departing from the spirit or scope of the inventions.

That is, the tub 2 of the present invention may have any shape as far as the shape has the rear wall of plastic for mounting the driving unit thereon. That is, even if the tub is not formed of plastic wholly, the tub is acceptable. For an example, a structure is acceptable, in which, while the rear wall for mounting the driving unit thereto is formed of plastic, a circumferential surface around an outside circumferential surface of the drum may be formed of metal, such as stainless steel.

Of course, the stator 14 illustrated in FIG. 8 is applicable to the drum type washing machine illustrated in FIG. 10 or 11.

The present invention has the following advantages.

The drum type washing machine of the present invention, of a direct motor coupling type, can reduce noise, faults, and power loss.

In fabricating the stator of a BLDC motor for a drum type washing machine, the present invention can reduce material, and weight, and simplify a fabrication process, and permits secure mounting of the stator to a mating part, such as the tub.

The present invention can provide a structure which can sustain weight and vibration of a motor from a side of the tub 2 in a case a washing machine BLDC motor is attached to a wall surface of the tub directly, which BLDC motor has 1.5 kg or more stator weight, and rotates at a speed varied in a range of 0~2,000 RPM or more.

The drum type washing machine of the present invention enables easy assembly of the stator 14 with the tub 2 on an assembly line, and, according to this, service by a service man can be made easily at the time of after service.

The formation of the rotor of the drum type washing machine of the present by pressing, with a good formability, permits to reduce a time period required for fabrication of the rotor, which improves productivity.

The employment of the helical type core of which winding is easy permits to prevent material from wasting, fabricate the core easily, and enhance rigidity of the fastening portions of the stator, to reduce noise and vibration, to improve mechanical reliability and elongate a lifetime.

The provision of the connector having a vibration mode different from the rotor permits to reduce transmission of vibration from the rotor to the shaft, and to support the stator, and maintain concentricity of the stator, effectively.

Thus, the present invention improves a structure of the driving unit of the drum type washing machine, to reduce noise and faults, and improve product reliability, and to improve productivity as productivity of components of the driving unit is improved.

What is claimed is:

1. A drum type washing machine comprising:
   a tub of plastic for holding washing water, the tub having a wall for mounting a driving unit thereto;
   a drum mounted on an inside of the tub;
   a shaft passed through the tub and coupled to the drum mounted inside of the tub, for transmission of driving force from a motor to the drum;
   at least one bearing for supporting the shaft;
   a bearing housing insert molded in the plastic tub for supporting the bearing;
   a stator to form the motor with a rotor;
   the rotor around the stator; and
   a tub supporter of metal between the wall of the tub and the stator,
   wherein the stator includes;
   an annular helical type core having multiple layers formed by winding a steel plate having Ts and a base portion in a helix starting from a bottom layer to a top layer,
   an insulator insert molded with the helical type core to cover an outside surface of the helical type core for electrical insulation of the helical type core, and
   three fastening portions formed as a unit with the insulator projected from an inside circumferential surface of the helical type core toward a center of the stator, for fastening the stator to the tub supporter, wherein the fastening portion has a fastening hole at a center for fastening the stator to the wall of the tub with screws.

2. The drum type washing machine as claimed in claim 1, wherein the insulator of the stator includes positioning projections, or holes, and the tub supporter includes holes, or projections in complementary to the positioning projections, or holes of the insulator.

3. The drum type washing machine as claimed in claim 1, wherein the tub supporter includes fastening holes in correspondence to fastening holes in the insulator of the stator.

4. The drum type washing machine as claimed in claim 1, further comprising a cylindrical metal for inserting in the fastening hole at the center of the fastening portion.

5. The drum type washing machine as claimed in claim 1, wherein the fastening portion has a height 20% or more of a total height of the core.

6. The drum type washing machine as claimed in claim 1, wherein the fastening portion has a height in a range of 20%~150% of a total height of the core.

7. The drum type washing machine as claimed in claim 1, wherein there are at least three the fastening portions.

8. The drum type washing machine as claimed in claim 1, wherein the fastening portion is formed such that a≧b where "a" denotes a length of the T projected from an outside circumferential surface of the helical type core, and "b" denotes a distance from the inside surface of the helical type core to a center of the fastening hole in the fastening portion.

9. The drum type washing machine as claimed in claim 1, wherein the fastening portion on the stator includes a hollow pin for damping vibration when the motor is driven.

10. The drum type washing machine as claimed in claim 1, wherein the multiple layers of the helical type core are held together with rivets passed through pass through holes in the base portion.

11. The drum type washing machine as claimed in claim 1, wherein the bottom layer, and the top layer, which are the winding starting portion and the winding end portion of the helical type core, are welded to a base portion, respectively.

12. The drum type washing machine as claimed in claim 1, wherein the stator has weight of 1.5 kg or more.

13. A drum type washing machine comprising:
a tub of plastic for holding washing water, the tub having a wall for mounting a driving unit thereto;
a drum mounted on an inside of the tub;
a shaft passed through the tub and coupled to the drum mounted inside of the tub, for transmission of driving force from a motor to the drum;
at least one bearing for supporting the shaft;
a bearing housing insert molded in the plastic tub for supporting the bearing;
a stator to form the motor with a rotor;
the rotor around the stator; and
a metal tub supporter between a wall of the tub and the stator,
wherein the stator includes;
an annular helical type core having multiple layers formed by winding a steel plate having Ts and a base portion in a helix starting from a bottom layer to a top layer,
an insulator to cover an outside surface of the helical type core for insulating the helical type core electrically, and
fastening portions formed as a unit with the insulator projected from an inside circumferential surface of the helical type core toward a center of the stator, for fastening the stator to the tub, wherein the fastening portion has a fastening hole at a center for fastening the stator to the wall of the tub with screws.

14. The drum type washing machine as claimed in claim 13, wherein the stator has a weight of 1.5 kg or more.

15. The drum type washing machine as claimed in claim 13, wherein the insulator of the stator includes positioning projections, or holes, and the tub supporter includes holes, or projections in complementary to the positioning projections, or holes of the insulator.

16. The drum type washing machine as claimed in claim 13, wherein the tub supporter includes fastening holes in correspondence to fastening holes in the insulator of the stator.

17. The drum type washing machine as claimed in claim 13, further comprising a cylindrical metal inserted in the fastening hole at the center of the fastening portion.

18. The drum type washing machine as claimed in claim 13, wherein the fastening portion has a height 20% or more of a total height of the core.

19. The drum type washing machine as claimed in claim 13, wherein there are at least three fastening portions spaced from one another and projected toward a center of the stator.

* * * * *